United States Patent Office

Re. 26,115
Reissued Nov. 22, 1966

26,115

AQUEOUS EXPLOSIVE SLURRIES CONTAINING SULFUR COMPOUNDS HAVING A LOW COEFFICIENT OF EXPANSION

William L. Schwoyer, Allentown, Pa., assignor to Trojan Powder Company, Allentown, Pa., a corporation of New York No Drawing. Original No. 3,222,232, dated Dec. 7, 1965, Ser. No. 350,550, Mar. 9, 1964. Application for reissue Feb. 1, 1966, Ser. No. 532,500
15 Claims. (Cl. 149—41)

Matter enclosed in heavy brackets [ ] appears in the original patent but forms no part of this reissue specification; matter printed in italics indicates the additions made by reissue.

*This application is a continuation—in part of application Serial No. 226,728, filed September 27, 1962, now abandoned.*

This invention relates to aqueous explosive slurries resistant to expansion upon exposure to elevated temperatures due to an unusually low coefficient of expansion with temperature.

Explosive slurries containing appreciable quantities of water or other fluids have recently become of considerable interest in the explosive art. These mixtures have a greater versatility than dry mixtures, because they can be used under conditions where water cannot be excluded. The fluid content of the slurries is more than that which is absorbed by the components of the mixture, and is sufficient to act at least in part as a suspending agent for the explosive ingredients. Such a fluid content in most cases ranges from about 0.5% to more than 30%, depending upon the materials present in the mixture, and upon the consistency desired.

A slurry having a reasonably stiff consistency, containing as little as 10% fluid, may be preferred for use in bulk in wet bore holes where the composition may be diluted with fluids such as water already present. Thickening or gelling agents are employed when thick slurries are required containing high proportions of fluids. A slurry that can be poured may be desired for use in bulk in dry bore holes, and such a slurry is easily obtained by using a rather large portion of fluid, for example, 20 to 50%, without a thickening or gelatinizing agent.

Such slurries, however, present a packaging problem not encountered with dry mixtures, because, due to their liquid content, they have a high coefficient of expansion with temperature. This expansion creates special difficulties when explosive slurries are packaged in flexible plastic containers, since the explosive slurry must fill the entire plastic container so that air is excluded therefrom, leaving no air space for expansion. This means that the container must either expand and contract with the slurried contents, or rupture. Even if it expands, dimensions change, usually unevenly, with the result that the container may become oversized for a particular bore hole, and wedge at a bend in the bore hole, if it even fits the hole.

Expansion and contraction within the resiliency limits of the plastic cartridge can be tolerated, and by selecting an appropriate type, grade and thickness of plastic material, the relative expansion coefficients can even be matched. However, some explosive mixtures, particularly those employing an inorganic nitrate as an oxidizer and a metal such as aluminum as a fuel, have an unusually high expansion coefficient, and require either thick containers, to prevent rupture, or very thin containers which have a high coefficient of expansion. Neither alternative is very desirable. In addition, such explosive slurries have a tendency to expand irreversibly. That is, upon being subjected to relatively hot day temperatures, the slurries will expand, but when the temperature decreases, as at nightfall or during normal climatic changes, the explosive compositions do not return to their original size, but to a size short of that. As a result, the explosive composition contained within the cartridge continuously exerts an undue pressure on the plastic container which is sufficient in time to cause rupture. Rupture is, of course, undesirable whenever it occurs.

While it is believed that the high expansion coefficient may be due, in some small part at least, to phase changes or changes in hydration of the inorganic nitrate, it appears that only when aluminum is present does the volume change assume large and undesirable proportions.

It has now been found, in accordance with the invention, that explosive slurries based on inorganic nitrates, aluminum and water can be so formulated as to have a low coefficient of expansion with temperature, by incorporating therein a small amount of a thiosulfate or organic sulfonate. Not only do the compositions of the invention display a markedly reduced tendency to expand on heating, but if they expand, they return to approximately their original normal dimensions when the temperature is again lowered. Thus, they display essentially no irreversible expansion characteristics. The explosive slurries of this invention are therefore more readily stored under a wide range of temperatures, and hence are safer to handle and use over such temperatures.

The thiosulfates $M_mS_2O_3$ which can be employed can be represented by the following formula:

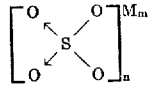

M is a cation and m and n are integers taken to satisfy the valences of M and the thiosulfate anion $S_2O_3^{=}$. Exemplary are the sodium, potassium, lithium, ammonium, calcium, barium and magnesium thiosulfates, which may be either in the anhydrous form or in the form of the respective hydrates.

The organic hydrocarbon sulfonates which can be employed have the general formula $RSO_3M$, where M is a cation, such as alkali metal, such as sodium and potassium, ammonium, an alkaline earth metal, such as calcium or magnesium, or an organic amine such as triethanolamine, and R is an organic hydrocarbon group, such as an alkyl, aryl, arylalkyl, alkylaryl or cycloalkyl group containing from about three to about fifty carbon atoms. Such hydrocarbon groups can also be substituted with carbonyl groups, ester groups, ehter groups, sulfide groups, culfuryl groups and additional sulfonate groups. Typical are the sodium petroleum hydrocarbon sulfonates, and the sodium benzene sulfonates, such as sodium benzene sulfonates, sodium dodecyl benzene sulfonate and sodium keryl benzene sulfonate. The benzene sulfonates have the structural formula:

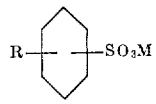

where M is a cation and R is hydrogen or an alkyl group of from one to thirty carbon atoms.

A preferred class of hydrocarbon sulfonates are the ester-substituted sulfonates. Such compounds have the structural formulas:

(1) $R_1—O—\underset{\underset{O}{\|}}{C}—R_2—SO_3M$ (2) $R_1—O—\underset{\underset{O}{\|}}{C}—R_2—\underset{\underset{O}{\|}}{C}—O—R_3$ wherein M is a cation as above and $R_1$, $R_2$ and $R_3$ are hydrocarbon groups containing from about one to about fifty carbon atoms. $R_1$ and $R_3$ can for example each be alkyl, aryl, alkylaryl, arylalkyl or cycloalkyl, and $R_2$ can be a bivalent alkylene, arylene, alkylarylene, arlyalkylene or cycloalkylene group. Preferably, $R_2$ is a bivalent alkylene group and contains from about two to ten carbon atoms, and $R_1$ and $R_3$ are alkyl groups containing from about five to about twenty carbon atoms.

The choice of thiosulfate or sulfonate will be made with regard to the fluid or fluid mixture used as a vehicle for the slurry. It should be soluble or easily dispersible in the vehicle. If only certain compounds are available, their solubility characteristics may determine the nature of the vehicle. Thus, water or aqueous vehicles are usually required for the thiosulfates. The organic sulfonates, on the other hand, can be used with water, oil, or mixtures thereof.

The oxidizing agent employed in the explosive slurry of this invention should be an inorganic nitrate. Ammonium nitrate and nitrates of the alkali and alkaline earth metals, such as sodium nitrate, potassium nitrate, calcium nitrate, magnesium nitrate, strontium nitrate and barium nitrate, are exemplary inorganic nitrates. Mixtures of several nitrates such as, for example, mixtures of sodium and ammonium nitrates, also yield excellent results. The inorganic nitrates may be fine, coarse, or a blend of fine and coarse materials. Mill and prill inorganic nitrates are quite satisfactory. For best results, the inorganic nitrates are usually fine grained.

In addition to the nitrate oxidizers, there is generally employed one or more fuels, including metal fuels and carbonaceous fuels, and an amount of water or water and oil sufficient to give the mixture the consistency desired, be it the consistency of a semi-solid material or the consistency of a free-flowing slurry. A sensitizing explosive can also be included, as an optional component.

The preferred sensitizing explosive is nitrostarch, but any sensitizing explosive known to the art can be used, alone or in admixture. Known sensitizing explosives which are useful include, for example, trinitrotoluene, dinitrotoluene, pentaerythritol tetranitrate, nitrostarch, tri-[methylolethene] *methylolethane* trinitrate, pentolite (a mixture of equal parts by weight of pentaerythritol tetranitrate and trinitrotoluene), cyclonite (RDX, cyclotrimethylene trinitramine), nitrocellulose, Composition B (a mixture of up to 60% RDX, up to 40% TNT and 1 to 4% wax) Cycloto] (Composition B without the wax), tetryl, and smokeless powder such as carbine ball powder.

The amount of thiosulfate or sulfonate required for a low coefficient of expansion in accordance with this invention is small. Generally, from 1 to 3% is employed for optimum results, although amounts as low as 0.3% give a reduction in the coefficient of expansion. More than about 3% would not usually be employed, as such large amounts are unnecessary to achieve the desired result, and therefore wasteful.

The relative proportions of nitrate oxidizer, and of sensitizing explosive if used, will depend upon the sensitivity and explosive shock wave desired and these, again, are dependent upon the particular nitrate and sensitizing explosive. The proportions are not critical in any way. For optimum effect, the nitrate oxidizer is used in an amount within the range from about 10 to about 95%, and the sensitizing explosive can be used in an amount within the range from 0 to about 40% by weight of the explosive composition. From about 25 to about 30% sensitizing explosive and from about 50 to about 70% nitrate oxidizer give the best results.

When the amount of sensitizing explosive is in the lower part of the range, or zero, a large booster is needed. At amounts beyond 40%, the sensitizing effect falls off, and is no longer proportional to the amount of sensitizing explosive added, and therefore amounts beyond 40% are not usually used.

Sensitizing explosives of any particle size can be used. They can, for example, be fine, coarse, or a blend of fine and coarse material. Some materials, such as nitrostarch, are commercially available as very finely-divided powders, and so also is trinitrotoluene. Such available materials are employed to advantage, because in most cases they tend to produce compositions having a greater explosive effect.

In addition to these materials, as has been indicated, the explosive compositions of the invention include aluminum, preferably in particulate form, for example aluminum powder, atomized aluminum, granular aluminum, or flake aluminum, which also serves as a lubricity-improving agent. Aluminum can be used in the form of alloys such as aluminum-magnesium alloys. Other metal fuels can also be used in conjunction with the aluminum, such as, for example, magnesium and ferrosilicon.

The metal fuel will usually comprise from about 0.5% to about 20% and preferably from 0.5 to 15% of the composition, of which fuel at least 50% is aluminum. If the amount of aluminum exceeds 15%, best stabilization is obtained if the aluminum is coarse, i.e., if at least 50% of the particles are 60 mesh or larger.

In addition to the metal fuel, a carbonaceous fuel can be included, such as powdered coal, petroleum oil, coke dust, charcoal, bagasse, dextrine, starch, wood meal, flour bran, pecan meal, and similar nut shell meals. A carbonaceous fuel when present will comprise from about 0.5 to about 30% of the mixture. Mixtures of metal and carbonaceous fuels can be used, if desired.

An antacid, or other stabilizing material, such as zinc oxide, calcium carbonate, aluminum oxide, and sodium carbonate, can also be added. Such ingredients will comprise from about 0.3 to about 2% of the mixture.

The amount of water and other fluid employed in the composition will vary with the consistency desired of the final mixture. Generally, when a semi-solid mixture is desired, especially for use in preparing cartridges, as little as 0.5% of water or mixture of water and other fluid such as oil can be used, and generally not more than 10% is needed. Where free-flowing slurries are desired, larger amounts of water or aqueous mixtures are generally employed, in most cases within the range of from about 10 to about 40%, although in some cases as much as 50% of fluid can be used.

In the case of oil, of course, the viscosity of the oil is a factor to be taken into consideration in determining the amount of fluid added. When mixtures of oil and water are used, there would generally be employed from 2 to 10% water and from 10 to 30% oil, to give a slurry having a satisfactory fluidity.

The consistency of this slurry, particularly of a free-flowing slurry, can be decreased to meet any need by incorporating a thickening or gelatinizing agent. In this way, it is possible to prepare a thick slurry containing a large proportion of fluid for use in bulk in dry bore holes. The thickening agent should be soluble or dispersible in the dispersing fluid and inert to the other ingredients present. The thickened slurry can be used to form explosive cartridges in the same manner as the slurries normally having a semi-solid consistency.

An oil slurry can be thickened by any of the noncarbonaceous inorganic oil thickeners useful in making thickened oils and greases, such as finely divided silica, available under the trade names Cab-O-Sil and Ludox, and silica aerogels, for example Santocel ARD and Santocel C, and like inorganic gelling agents, such as alumina, attapulgite and bentonite, can be used. Other oil-gelling agents are disclosed in U.S. Patent Nos. 2,655,476 and 2,711,393. These are well known materials, and any of these known to the art can be used. The amount of such thickening agent will depend on the consistency desired, and usually will be within the range from 0 up to about 5%. Enough thickener can be added to gel the oil, and water-proofing agents such as are disclosed in U.S. Patent Nos. 2,554,222, 2,655,476 and 2,711,393 also can be incorporated as well to impart water resistance to the gelled oil slurry.

An aqueous slurry can be thickened by any water-soluble or water-dispersible thickener, such as, for example, carboxymethyl cellulose, methyl cellulose, guar gum, psyllium seed mucilage, and pregelatinized starches such as Hydroseal 3B. The amount of such thickening agent will depend on the consistency desired, and usually will be within the range from 0 to about 5%.

The explosive of the invention can, if desired, be fired with the aid of a booster charge. Any conventional cap-sensitive booster charge available in the art can be employed. Pentaerythritol tetranitrate, Composition B and pentolite are exemplary. The booster charge preferably is non-shock or impact sensitive. The amount of booster charge required depends, of course, upon the amount and sensitivity of the explosive mixture.

The explosive mixture is readily prepared by simple mixing of the ingredients. The solid materials, including the thiosulfate or sulfonate, the inorganic nitrates and sensitizing explosives, if any, fuels, and antacid, if any, would usually be mixed at first, to form a homogeneous blend, and the slurrying liquid and slurry liquid thickener, if required, would be added with stirring to bring the mixture to the desired consistency Where cartridges are to be formed, the consistency is usually comparable to that of a gelled oil or thick, barely pourable mixture, and the mixture is filled or extruded into open-ended containers, using conventional filling or extrusion equipment, to produce the explosive package.

The containers can be formed of any container material not dissolved or attacked by the slurry liquid or liquids. Heavy plastic is inexpensive and available in sufficient thickness of wall, and is therefore preferred. Typical plastic and cellulosic materials which can be used include polyethylene, ethyl cellulose, cellulose acetate, polypropylene, polytetrafluoroethylene, nylon, polyvinyl chloride, polystyrene and polyvinylidene chloride, and nonferrous metals, such as tin, copper and aluminum. Fibrous materials such as wood, paper, and cardboard can be used, if waterproofed or otherwise made resistant to the slurrying liquid.

The following examples in the opinion of the inventor represent the preferred embodiments of this invention:

EXAMPLE 1

An explosive mixture of semi-solid consistency (A in the table below) was prepared using nitrostarch, fine grained mill ammonium nitrate, fine grained mill sodium nitrate, flake aluminum, anhydrous sodium thiosulfate, water and the additional ingredients noted in the table below. The nitrostarch oil and mixed nitrates were thoroughly blended and were then added to the zinc oxide, flake aluminum, guar gum and sodium carboxymethyl cellulose. The sodium thiosulfate was dissolved in the water and then added to the mixture. The proportions of the final explosive compositions were as follows:

| Ingredients | A Invention | B Control |
|---|---|---|
| | Percent | Percent |
| Nitrostarch | 25.8 | 26.2 |
| Mill ammonium nitrate | 45.1 | 47.0 |
| Mill sodium nitrate | 15.5 | 14.2 |
| Flake aluminum | 1.9 | 2.0 |
| Zinc oxide | 0.8 | 1.0 |
| Sodium carboxymethyl cellulose | 1.0 | 1.0 |
| Guar gum | 0.7 | 0.8 |
| Oil No. 5 | 0.3 | ---------- |
| Sodium thiosulfate (anhydrous) | 1.2 | ---------- |
| Water | 7.7 | 7.8 |

Composition A was quite stiff, and was easily extruded through conventional extrusion nozzles into cartridges 36 inches long by 1¼ inches in diameter made of string wrapped paper encased in polyethylene, 2 to 3 mils in thickness. A 4 gram cast pentolite booster containing a No. 6 blasting cap was inserted into the cartridge. The cartridge was then inserted in a bore hole 2¼ inches in diameter. The cartridge was fired, and gave a detonation rate greater than 5000 meters per second, indicating that the composition was a satisfactory explosive.

Six of the cartridges so prepared were then subjected to expansion tests in four cycles. Each cycle included heating the cartridges at 100 to 125° F. for 7 to 7¾ hours, approximately equal to the time they might be subjected to that temperature under conditions of use, and then lowering the temperature to 66 to 68° F. After each cycle three diameter measurements were taken, at marked places on each cartridge, at both end and the center and the measurements were averaged, and reported as the average diameter of the cartridge at each cycle.

The test included a series of control cartridges prepared in the same manner except that the control explosive composition (B) did not contain sodium thiosulfate.

The results are recorded below in Table I. The difference between the initial diameter and the diameter after each of the cycles represents the irreversible expansion that has been acquired by the explosive composition. A burst cartridge is indicated by *.

Table I

AVERAGE DIAMETER IN INCHES AFTER HEATING AT TEMPERATURE AND TIME INDICATED

| No. | Cartridge No. with thiosulfate composition | Initial, 66° F. | 7 hrs. at 100° F., cooled to 66° F. | 7¾ hrs. at 110° F., cooled to 68° F. | 7 hrs. at 110° F., cooled to 66° F. | 7 hrs. at 125° F., cooled to 68° F. | Increase in diameter | |
|---|---|---|---|---|---|---|---|---|
| | | | | | | | Total | Percent |
| A | 1 | 1.293 | 1.293 | 1.300 | 1.303 | 1.313. | 0.020 | 1.5 |
| | 2 | 1.277 | 1.277 | 1.280 | 1.283 | 1.287 | 0.010 | 0.78 |
| | 3 | 1.297 | 1.293 | 1.297 | 1.297 | 1.300 | 0.003 | 0.23 |
| | 4 | 1.270 | 1.270 | 1.273 | 1.277 | 1.280 | 0.010 | 0.79 |
| | 5 | 1.273 | 1.273 | 1.273 | 1.277 | 1.283 | 0.010 | 0.78 |
| | 6 | 1.273 | 1.277 | 1.280 | 1.280 | 1.283 | 0.010 | 0.78 |
| | Control (no thiosulfate) | | | | | | | |
| B | 7 | 1.297 | 1.307 | 1.330 | (*) | ---------- | ---------- | ---------- |
| | 8 | 1.303 | 1.320 | 1.343 | 1.360 | 1.387 | 0.084 | 6.4 |
| | 9 | 1.287 | 1.293 | 1.303 | 1.330 | (*) | ---------- | ---------- |
| | 10 | 1.287 | 1.293 | 1.303 | 1.320 | (*) | ---------- | ---------- |
| | 11 | 1.273 | 1.283 | 1.290 | 1.307 | 1.330 | 0.057 | 4.4 |
| | 12 | 1.300 | 1.313 | 1.323 | (*) | ---------- | ---------- | ---------- |
| | 13 | 1.287 | 1.290 | 1.300 | 1.313 | 1.330 | 0.043 | 3.3 |

*The polyethylene cartridge burst at one end during the heating portion of the cycle, the explosive composition escaping therefrom.

The results of Table I show the exceptionally low coefficient of expansion of the compositions of this invention. Cartridges Nos. 1 to 6, which were filled with explosive compositions containing sodium thiosulfate in accordance with this invention, showed a total increase in diameter over the entire treating period ranging from only 0.23% to 1.5. Five of the cartridges containing the explosive composition of this invention showed a percent increase in diameter of less than 0.8% over the entire cycle. In addition, none of the cartridges containing the explosive compositions of this invention had expanded sufficiently during the test to cause the rupture of the polyethylene cartridge.

In contrast, four out of the seven cartridges which contained the control composition, the same composition as in Cartridges Nos. 1 to 6, except for the absence of sodium thiosulfate, were unable to withstand the test conditions, and ruptured as a result of the expansion of the explosive composition beyond the elastic limit of the polyethylene container during the course of the heating cycles. Of the three control compositions which survived the test conditions, No. 8 showed an increase in diameter of 6.4% and Nos. 12 and 13 showed increases of 3.3% and 4.4% respectively. It can only be assumed that had the four ruptured cartridges been able to survive the temperatures, their percent increase in diameter would have exceeded the 6.4% withstood by composition No. 8.

Thus, it can be seen that the presence of a small quantity of sodium thiosulfate not only decreases the amount of irreversible expansion suffered by the explosive composition but also inhibits the reversible thermal expansion acquired by the explosion compositions.

In order to test the effect of prolonged heating on the explosive compositions of this invention additional cartridges containing Composition A were subjected to a more rigorous test. After preparation, the cartridges were first held at a temperature of 70° F. for 24 hours and the diameters measured. The temperature was then raised to 105° F., maintained for 24 hours, and thereafter cooled to 72° F. for 24 hours. The temperature was then raised to 92° F., maintained for 6¼ hours, and lowered to 66° F. for 18 hours. Thereafter, the cartridges were maintained at 125° F. for 24 hours and then at 66° F. for 24 hours. The temperature was then raised to 113° F. for 17 hours and cooled to 66° F. for 7 hours. The results are indicated in Table II.

Table II

AVERAGE DIAMETER INCHES, AFTER HEATING, AT TEMPERATURE FOR TIME

| Cartridge No. | Initial, 70° F. | 24 hrs. at 105° F., cooled to 72° F. | 6¼ hrs. at 92° F., cooled to 66° F. | 24 hrs. at 125° F., cooled to 66° F. | 17 hrs. at 113° F., cooled to 66° F. | Increase in diameter | |
|---|---|---|---|---|---|---|---|
| | | | | | | Total | Percent |
| 14 | 1.267 | 1.273 | 1.287 | 1.290 | 1.293 | 0.026 | 1.6 |
| 15 | 1.260 | 1.267 | 1.267 | 1.270 | 1.270 | 0.010 | 0.79 |
| 16 | 1.273 | 1.263 | 1.270 | 1.270 | 1.270 | −0.003 | 0 |
| 17 | 1.287 | 1.290 | 1.287 | 1.310 | 1.313 | 0.026 | 2.0 |
| 18 | 1.283 | 1.270 | 1.280 | 1.280 | 1.277 | −0.006 | 0 |
| 19 | 1.283 | 1.293 | 1.293 | 1.333 | 1.320 | 0.037 | 2.9 |
| 20 | 1.277 | 1.280 | 1.293 | 1.290 | 1.290 | 0.013 | 1.0 |
| 21 | 1.277 | 1.277 | 1.280 | 1.280 | 1.283 | 0.006 | 0.47 |
| 22 | 1.273 | 1.273 | 1.273 | 1.297 | 1.287 | 0.014 | 1.0 |
| 23 | 1.283 | 1.290 | 1.290 | 1.300 | 1.303 | 0.020 | 1.6 |
| 24 | 1.270 | 1.270 | 1.263 | 1.300 | 1.300 | 0.030 | 2.4 |
| 25 | 1.247 | 1.307 | 1.313 | 1.317 | 1.317 | 0.020 | 1.6 |
| 26 | 1.290 | 1.280 | 1.277 | 1.293 | 1.300 | 0.010 | 0.78 |
| 27 | 1.307 | 1.307 | 1.303 | 1.330 | 1.333 | 0.034 | 2.6 |
| 28 | 1.273 | 1.277 | 1.273 | 1.280 | 1.277 | 0.004 | 0.31 |
| 29 | 1.287 | 1.297 | 1.297 | 1.310 | 1.310 | 0.023 | 1.8 |
| 30 | 1.250 | 1.250 | 1.253 | 1.260 | 1.260 | 0.010 | 0.80 |
| 31 | 1.260 | 1.273 | 1.267 | 1.270 | 1.276 | 0.016 | 1.3 |
| 32 | 1.303 | 1.303 | 1.317 | 1.363 | 1.350 | 0.047 | 3.6 |

These results show that the explosive compositions of this invention are capable of withstanding very severe storage conditions.

EXAMPLE 2

The following explosive composition was mixed as in Example 1:

| Ingredient: | Percent |
|---|---|
| Nitrostarch | 22.75 |
| Mill ammonium nitrate | 48.15 |
| Mill sodium nitrate | 14.25 |
| Flake aluminum | 2.00 |
| Sodium thiosulfate (anyhydrous) | 1.00 |
| Guar gum | 1.00 |
| Sodium carboxymethyl cellulose | 0.60 |
| Zinc oxide | 1.00 |
| Water | 9.25 |

This composition was [bumped] *bump* loaded into ½" by 6" test tubes, which were stoppered, leaving no air space, and stored at a temperature between 100 and 130° F. for five months. No expansion sufficient to blow off the test tube stopper was noted, indicating that no appreciable expansion of the explosive composition had occurred.

EXAMPLE 3

Two compositions were prepared to show that the sulfur containing compound of this invention actually exerts its stabilizing action upon the nitrate and the aluminum components of the explosive slurry. The two compositions each contained 85 parts of sodium nitrate, 12 parts of flake aluminum and 3 parts of water. Two parts of sodium thiosulfate pentahydrate was then added to one of the compositions. Each of the compositions was placed in a test tube filled to within about one half inch of the brim and the tubes were then tightly stoppered. The test tubes were then placed in a water bath maintained at 98° C. The object of this experiment was to determine the time necessary for the cork to be forced out of the test tube because of the expansion of the nitrate-aluminum slurry. It was found that the composition which did not contain sodium thiosulfate expanded sufficiently so as to force the cork out of the test tube 24 minutes after immersion in the water bath. The composition embodying this invention, i.e., the composition containing sodium thiosulfate had not expanded sufficiently to force the cork from the test tube after two hundred minutes, when the test was stopped. The same experiment was repeated, using 3 parts of anhydrous sodium thiosulfate in place of the 2 parts of the sodium thiosulfate pentahydrate used previously. After 305 minutes, when the test was stopped, the cork had still not been forced from the test tube.

EXAMPLE 4

A series of additional experiments was run using 85 parts of sodium nitrate, 12 parts of flake aluminum and 3 parts of water as the basic explosive composition. A thiosulfate or sulfonate was added, as noted in Table III below. Test tubes were filled with the composition and tightly corked, and the test tubes then immersed in water baths at 98° C. in order to determine the length of time necessary for the cork to be forced from the tube. This time is noted in Table III.

Table III

| | Parts by weight | | |
|---|---|---|---|
| | A | B | C |
| Sodium nitrate | 85 | 85 | 85 |
| Flake aluminum | 12 | 12 | 12 |
| Sodium thiosulfate (anhydrous) | ---------- | 1.5 | ---------- |
| Dioctyl ester of sodium sulfosuccinic acid | ---------- | ---------- | 1.5 |
| Water | 3 | 3 | 3 |
| Time to pop cork (minutes) | 85 | *472 | *145 |

*After this time, test was stopped without the cork having been forced from the tube.

This example shows that sodium thiosulfate and the dioctyl ester of sodium sulfoscuccinic acid substantially inhibited thermal expansion of the composition. The coefficient of expansion of sodium nitrate varies with impurities in the batch, and this accounts for the fact that the composition in Example 3 forced the cork from the tube in 24 minutes, while the composition of the example required 85 minutes.

EXAMPLE 5

Two explosive compositions were prepared as in Example 1 of the following ingredients:

| Ingredients | Parts by weight | |
|---|---|---|
| | A | B |
| Nitrostarch | 7.70 | 7.70 |
| Mill ammonium nitrate | 67.20 | 67.20 |
| Mill sodium nitrate | 13.49 | 13.49 |
| Zinc oxide | 0.10 | 0.10 |
| Unbleached wheat flour | 4.00 | 4.00 |
| Anthracite coal | 3.00 | 3.00 |
| Flake aluminum | 0.50 | 0.50 |
| Atomized aluminum | 1.50 | 1.50 |
| Mineral oil (100 S.S.U.) | 0.20 | 0.20 |
| Carbon black | 0.01 | 0.01 |
| Sodium thiosulfate (anhydrous) | ---------- | 1.50 |
| Water | 2.30 | 2.30 |

Compositions A and B were substantially identical in explosive properties, but Composition B was found to have negligible coefficient of expansion, as compared to Composition A without sodium thiosulfate.

EXAMPLE 6

Two explosive compositions were prepared as in Example 1 of the following ingredients:

| Ingredients | Parts by weight | |
|---|---|---|
| | A | B |
| Nitrostarch | 12.30 | 12.30 |
| Mill ammonium nitrate | 41.00 | 41.00 |
| Coarse ammonium nitrate | 25.00 | 25.00 |
| Mill sodium nitrate | 9.04 | 9.04 |
| Zinc oxide | 0.20 | 0.20 |
| Unbleached wheat flour | 3.50 | 3.50 |
| Anthracite coal | 2.50 | 2.50 |
| Flake aluminum | 1.50 | 1.50 |
| Mineral oil (100 S.S.U. at 135° F.) | 0.25 | 0.25 |
| Carbon black | 0.01 | 0.01 |
| Sodium thiosulfate (anhydrous) | ---------- | 1.50 |
| Water | 5.00 | 5.00 |

The results indicated that Composition B was as good an explosive as the thiosulfate-free material A, but had a very low coefficient of expansion.

EXAMPLE 7

Two explosive slurry formulations were made up to the following formulations:

| Ingredients | Parts by Weight | |
|---|---|---|
| | A | B |
| Ammonium nitrate, whole prills | 45.40 | 45.00 |
| Nitrostarch, dry | 20.00 | 20.00 |
| Sodium nitrate | 15.00 | 15.00 |
| Aluminum, atomized | 6.00 | 6.00 |
| Guar gum | 0.50 | 0.50 |
| Water | 11.50 | 11.50 |
| Petroleum oil | 0.60 | 0.50 |
| Zinc oxide | 1.00 | 1.00 |
| Sodium thiosulfate (anhydrous) | ---------- | 0.50 |

These formulations were packed in 1¼" x 8" cartridges and subjected to storage tests cycling between temperatures of 86° to 106° F. for a period of 46 days. Following are the results of the tests:

| | A Limit of variation | | B Limit of variation | |
|---|---|---|---|---|
| Density | 1.39 | 1.38 | 1.40 | 1.36 |
| Gain or loss in cc./volume from 150 cc. | +10 | +10 | +2 | −3 |
| Percent expansion (86° F.) | +6.6 | +6.6 | +1.4 | −2.1 |

The results show that the sodium thiosulfate held expansion to a minimum under the test conditions.

EXAMPLE 8

Four explosive slurries were made up to the following formulation:

| | A | B | C | D |
|---|---|---|---|---|
| | Percent | Percent | Percent | Percent |
| Ammonium nitrate, Monsanto E-2 prills | 65.25 | 65.00 | 21.50 | 21.25 |
| Sodium nitrate, mill | 5.00 | 5.00 | 38.00 | 38.00 |
| Aluminum granules (Almeg M-30) | 15.00 | 15.00 | ---------- | ---------- |
| Riffle coal | 1.00 | 1.00 | ---------- | ---------- |
| Guar gum (Jaguar 100) | 0.75 | 0.75 | 0.50 | 0.50 |
| Water | 13.00 | 13.00 | 14.00 | 14.00 |
| Sodium thiosulfate (anhydrous) | ---------- | 0.25 | ---------- | 0.25 |

These formulations were packed in 1¼" x 8" cartridges and subjected to storage tests cycling between temperatures of 86° to 106° F. for a period of 46 days. Following are the results of the tests:

| | A | B | C | D |
|---|---|---|---|---|
| Gain or loss in cc./volume from 140 cc. | +10 | 0 | +3.0 | 0 |
| Percent expansion | +6.9 | 0 | +3.5 | 0 |

The results show that the sodium thiosulfate (B and D) prevented expansion under the test conditions.

EXAMPLE 9

An explosive mixture of semi-solid consistency (A in the table below) was prepared using nitrostarch, grained mill ammonium nitrate, mill sodium ntirate, flake aluminum, sodium benzene sulfonate, water and the additional ingredients noted in the table below. The nitrostarch, oil and mixed nitrates were thoroughly blended and were then added to the zinc oxide, flake aluminum, guar gum and sodium carboxymethyl cellulose. The sodium benzene sulfonate was dissolved in the water and then added to the mixture. The proportions of the final explosive compositions were as follows:

| Ingredients | A Invention | B Control |
|---|---|---|
| | Percent | Percent |
| Nitrostarch | 22.75 | 22.75 |
| Mill ammonium nitrate | *48.65* [49.65] | *49.65* [48.65] |
| Mill sodium nitrate | 14.25 | 14.25 |
| Flake aluminum | 2.00 | 2.00 |
| Zinc oxide | 1.00 | 1.00 |
| Sodium carboxymethyl cellulose | 0.60 | 0.60 |
| Guar gum | 0.50 | 0.50 |
| Sodium benzene sulfonate | 1.00 | ---------- |
| Water | 9.25 | 9.25 |

These formulations were packed in 1¼" x 8" cartridges and subjected to storage tests cycling between temperatures of [68°] *86°* to 106° F. for a period of 7 days. Following are the results of the tests:

| | A | B |
|---|---|---|
| Gain or loss in cc./volume from 165 cc | +5 | 0 |
| Percent expansion | +3 | 0 |

The results show that the sodium benzene sulfonate (B) prevented expansion under the test conditions.

The following is claimed:

1. An aqueous slurried explosive composition characterized by a low coefficient of expansion with temperature comprising an inorganic nitrate oxidizer in an amount within the range from about 10 to about 95%, particulate aluminum in an amount within the range from about 0.5 to about 20%, an aqueous liquid in an amount to form a slurry, a sulfur compound selected from the group consisting of inorganic thiosulfates and organic sulfonates in an amount sufficient to inhibit the thermal expansion of the slurry.

2. An aqueous slurried explosive in accordance with claim 1 in which the sulfur compound is an inorganic thiosulfate.

3. An aqueous slurried explosive in accordance with claim 2 in which the thiosulfate is sodium thiosulfate.

4. An aqueous slurried explosive in accordance with claim 1 wherein the sulfur compound is an organic sulfonate.

5. An aqueous slurried explosive in accordance with claim 4 in which the sulfonate is an organic hydrocarbon sulfonate.

6. An aqueous slurried explosive in accordance with claim 4 in which the sulfonate is an ester-substituted hydrocarbon sulfonate.

7. An aqueous slurried explosive in accordance with claim 6 in which the sulfonate is an alkyl ester of sodium sulfosuccinate.

8. An aqueous slurried explosive in accordance with claim 1 in which the inorganic nitrate is ammonium nitrate.

9. An aqueous slurried explosive in accordance with claim 1 in which the inorganic nitrate is a mixture of ammonium nitrate and another inorganic nitrate.

10. An aqueous slurried explosive in accordance with claim 1 containing sufficient water to impart to the composition a semi-solid consistency.

11. An aqueous slurried explosive in accordance with claim 1 comprising a thickening agent in an amount to increase the consistency of the composition.

12. An aqueous slurried explosive in accordance with claim 1 comprising an explosive sensitizer.

13. An aqueous slurried explosive in accordance with claim 1 in which the slurrying liquid is water.

14. An aqueous slurried explosive in accordance with claim 1 in which the slurrying liquid is water and oil.

15. A method of reducing the coefficient of thermal expansion of aqueous slurried explosive compositions comprising an inorganic nitrate oxidizer in an amount within the range from about 10 to about 95% particulate aluminum in an amount within the range from about 0.5 to about 20%, and an aqueous liquid in an amount to form a slurry, which comprises incorporating therein a sulfur compound selected from the group consisting of inorganic thiosulfates and organic sulfonates in an amount sufficient to inhibit thermal expansion.

References Cited by the Examiner

The following references, cited by the Examiner, are of record in the patented file of this patent or the original patent.

UNITED STATES PATENTS

| | | | |
|---|---|---|---|
| 3,094,069 | 6/1963 | Hradel | 149—43 X |
| 3,111,437 | 11/1963 | Hino et al. | 149—46 |
| 3,116,185 | 12/1963 | Wilson et al. | 149—46 X |
| 3,121,036 | 2/1964 | Cook et al. | 149—41 |
| 3,147,163 | 9/1964 | Griffith et al. | 149—39 |

CARL D. QUARFORTH, *Primary Examiner.*

B. R. PADGETT, *Assistant Examiner.*

UNITED STATES PATENT OFFICE

CERTIFICATE OF CORRECTION

Reissue No. 26,115 November 22, 1966

William L. Schwoyer

It is hereby certified that error appears in the above numbered patent requiring correction and that the said Letters Patent should read as corrected below.

Column 1, line 43, for "portion" read -- proportion --; column 2, lines 33, the formula should appear as shown below instead of as in the patent:

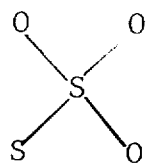

line 48, for "ehther" read -- ether --; same line 48, for "culfuryl" read -- sulfuryl --; column 7, line 7, for "1.5" read -- 1.5% --; column 9, line 6, for "composition" read -- compositions --; column 10, line 69, for "ntirate" read -- nitrate --.

Signed and sealed this 29th day of August 1967.

(SEAL)
Attest:

ERNEST W. SWIDER
Attesting Officer

EDWARD J. BRENNER
Commissioner of Patents